United States Patent Office 3,794,560
Patented Feb. 26, 1974

3,794,560
FUEL SPHERE PILE REACTOR
Franz Rohr, Lange Zeile 64, Erlangen, Germany
Filed Nov. 24, 1971, Ser. No. 201,580
Claims priority, application Germany, Nov. 26, 1970,
P 20 58 158.2
Int. Cl. G21c 3/04
U.S. Cl. 176—81                                   1 Claim

ABSTRACT OF THE DISCLOSURE

Fuel sphere pile reactor including a pile of nuclear fuel elements each formed of a spherical first container wherein nuclear fuel is received, each of the fuel elements being received in a second container having at least an outer spherical shape and having an inner volume greater than the volume of the first container, the second container being formed with perforations for admitting coolant to the interior of the second container to be received therein in addition to the first container.

---

Figure 1:
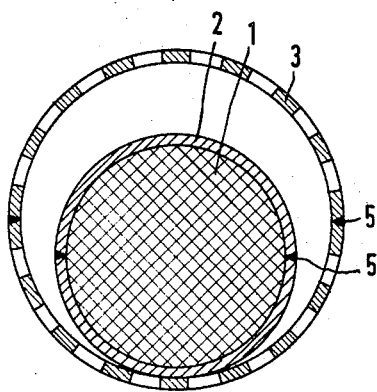

The invention relates to a fuel sphere pile reactor or a reactor having a spherical fuel element pile.

When disposing fuel elements in a nuclear reactor care must be taken, with respect to uniform heating of the fuel elements and the gaseous or liquid coolant flowing around them, that as uniform a distribution of the fuel elements as possible be provided in the space allocated to them.

As presented in, among other publications, the article "The Influence of Fission Gas Pressure on the Construction of Nuclear Reactor Fuel Elements With Metallic Cladding or Casing," by J. N. Eisner, published in "Atompraxis" 16, Number 2, 1970, pages 96 to 100, mainly spherical and cylindrical forms of fuel elements are suited for obtaining a uniform distribution of the volume of fuel elements in the reactor.

In a fuel sphere pile reactor, in which the fuel elements are of spherical construction and are piled on one another, a more uniform distribution of the fuel material is doubtless realized than in a spherical pile reactor with cylindrically shaped fuel rods, because, in the case of the spherical construction, the same fuel density per unit length is attained in both the vertical as well as the horizontal direction. An advantage of the cylindrical disposition of the fuel elements, as compared with the piling up of spheres is described on page 100 of the above-cited article wherein it is noted that very high fission gas pressures must be expected with the spherical disposition of the fuel elements if they are surrounded by a gas-tight casing because outside of the active zone no space (plenum) is available to receive the fission gases. It is true that such a space would be available if the fuel element were made smaller than the gas-tight casing, but such a layout is not economical due to the poor heat transfer from the fuel element to the gas-tight casing. Any disposition of spaces or chambers to receive the fission gas between the fuel element and the gas-tight enclosure at specific locations of the sphere would, however, alter the spherical shape and therefore, if the sphere were arranged in a simple pile, would alter the uniform distribution of the fuel elements in the space, which can result in the production of local overheating phenomena in the reactor.

The cylindrical disposition of the fuel in fuel rods has a further advantage over the spherical shape, because a pile of spheres, regardless of the diameter of the spheres, leaves free only approximately one-sixteenth ($\frac{1}{16}$) of the available space for the coolant. Particularly, in the case of liquid coolants, which can act simultaneously as the moderator, this has the disadvantage that very high coolant pressures are required in order to assure adequate cooling of the fuel elements. The advantage that the surface of the fuel elements is substantially larger for the same volume in the spherical arrangement, is therefore offset by the disadvantage that the cross section for the passage of the coolant is necessarily smaller.

For these reasons, fuel sphere pile reactors are constructed primarily in conjunction with gaseous coolants, while reactors with liquid coolant ($H_2O$; $D_2O$) contain the nuclear fuel in the form of cylindrical rods, in which case, spacers ensure the mutual spacing of the rods as uniformly as possible.

Theoretically, the possibility also exists of supporting spherical fuel elements by using support grids acting as spacers, but then the fuel elements can no longer be exchanged individually or in groups during operation, as is possible with reactors with cylindrical fuel rods by removing or inserting groups of fuel rods, and as is also possible with a spherical disposition of the fuel elements which are simply pile one upon the other readily by letting the lower spheres, respectively, roll out. Thereby, a sphere situated in the center of the pile of spheres will eventually travel downwardly so that every sphere can be removed during operation of the reactor, tested as to its burn-up condition and can either be removed or returned to the reactor.

It is accordingly an object of the present invention to provide a fuel sphere pile reactor with piled fuel elements disposed in spherically shaped cans or containers which, while retaining the aforementioned advantages of the spherical distribution of fuel elements, also permits the flow cross section for the coolant to be selected without restraint so that no excesisvely high coolant pressures are required. It is further object of the invention to provide such a fuel sphere pile reactor with gas-tight containers that can be used with spaces or chambers for receiving therein the fission gases outside of the radioactive zone without any appreciable sacrifice of thermal conductivity.

With the foregoing and other objects in view, there is provided in accordance with the invention, fuel sphere pile reactor comprising a pile of nuclear fuel elements each formed of a spherical first container wherein nuclear fuel is received, each of the fuel elements being received in a second container having at least an outer spherical shape and having an inner volume greater than the volume of the first container, the second container being formed with perforations for admitting coolant to the interior of the second container to be received therein in addition to the first container.

Other features which are considered as characteristic for the invention are set forth in the appended claims.

Although the invention is illustrated and described herein as embodied in fuel sphere pile reactor, it is nevertheless not intended to be limited to the details shown, since various modifications and structural changes may be made therein without departing from the spirit of the invention and within the scope and range of equivalents of the claims.

Figure 3:
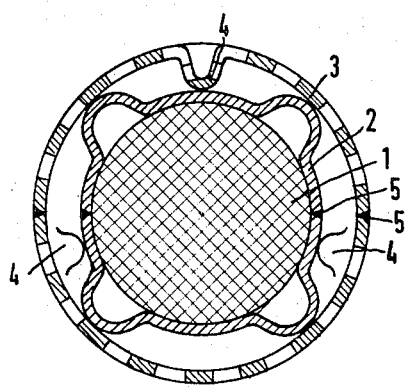
Figure 4:
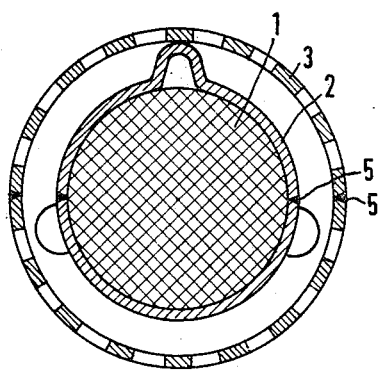
Figure 5:
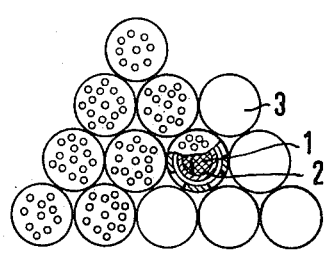

The construction and method of operation of the invention, however, together with additional objects and advantages thereof, will be best understood from the following description of specific embodiments when read in connection with the accompanying drawing, in which:

FIGS. 1 to 4 are cross-sectional views of four different embodiments of the assembly of a fuel element within a perforated spherical container constructed in accordance with the invention; and FIG. 5 is a diagrammatic view of a pile of the spherical assemblies of FIGS. 1 to 4.

Referring now to the drawing and first, particularly to FIGS. 1 to 4 thereof, there is shown therein, as aforementioned, four embodiments of the fuel elements 1, 1', 1″ received in a substantially spherical container 3, 3′. In these embodiments, the fuel element itself, as well as the gas-tight casing or can 2, 2′, 2″ enclosing the respective fuel element, are of substantially spherical construction. The use of a spherical fuel element is advantageous if at the same time a gas-tight casing or can is used, because a sphere, due to its uniform construction, can unquestionably withstand very high pressures in the interior thereof. However, the invention of this application is not limited to this shape of fuel element. Nor is it necessary that the fuel elements have a gas-tight casing or can. For example, a parallelepipedal fuel element without a gas-tight casing could be supported in a container having an outer spherical shape, without losing the basic advantages of a fuel sphere pile reactor and the advantages resulting from the perforated enclosure. In the illustrated embodiments of FIGS. 1 to 4, the perforated container 3, 3′ is formed of punched or stamped out sheet metal, but a sufficiently flexure-resistant wire mesh screen or some other container that is permeable to the coolant can also be provided.

The simplest form of support for a fuel element 1 with a gas-tight casing or can 2 inside a perforated container 3 is shown in FIG. 1. Here, the fuel element 1 and the gas-tight casing 2 are each formed in a sphere which lies freely in a similarly spherically shaped enclosure or container 3. The weight of the fuel element 1 keeps each sphere in the position shown in FIG. 1, so that when the spheres are formed into a pile, as shown in FIG. 5, wherein the enclosures or containers 3 are in direct contact with each other, the centers of the fuel elements 1 are also equally spaced from one another. Depending upon the velocity of the coolant flow, it is possible that, in the embodiment of FIG. 1, the fuel elements 1 may shift from the position thereof shown in FIG. 1, so that nonuniformities or irregularities in the distribution of the fuel elements 1 may occur. However, this can be prevented if the flow of the coolant is not directed upwardly from the bottom or from either side, but only downwardly from the top, as viewed in FIG. 1. In this case, the force of gravity and the coolant flow act in the same direction so that the fuel element 1 has no cause to shift from the position shown in FIG. 1. In the event that the fuel element construction according to the invention is to be used in a reactor in which it is permissible for the fission gases to escape into the coolant, the fuel element 1 may also be disposed directly within the perforated enclosure 3 without being enclosed in a gas-tight can or casing 2.

Figure 2:
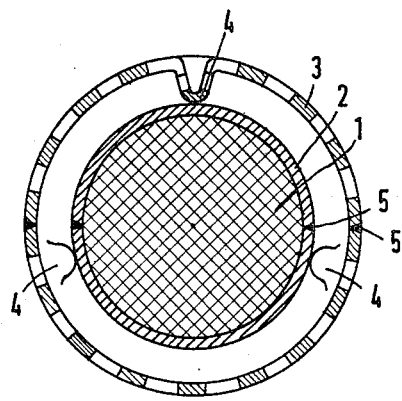

It is also possible, however, to center the fuel element 1 in the interior of the perforated enclosure or container 3′ without great expense, as can be seen in FIG. 2. Thus, the perforated container 3′ is provided with radially inwardly directed indentations 4 which, in the embodiment of FIG. 2, are spatially offset from one another by an arc of 120° so that a total of four indentations (one of which is not shown in FIG. 2) is sufficient to center the fuel element 1 in the perforated enclosure or container 3′. Such an assembly has the advantage that the direction of the coolant flow can be selected at will without danger that a nonuniform distribution of the fuel could occur in the reactor, and that, furthermore, a more uniform cooling of the fuel element 1 can be attained due to the fact that the contact area between the fuel element 1 and the enclosure or container 3′ is smaller as well as uniformly distributed over the circumference of the fuel element 1. The individual spheres 2 and 3′ are assembled from half-shells which are welded together at welding seams 5.

When the perforations in the enclosure or container 3′ are produced by punching into the container sphere, the embodiment of FIG. 2 represents no large additional expenditure as compared with the embodiment of FIG. 1, because the indentations 4 can be formed in the same punching process as the perforations.

In FIGS. 3 and 4, like parts are assigned the same reference characters as in FIGS. 1 and 2. In the embodiments of FIGS. 3 and 4, fission gas spaces or plena are provided between the fuel elements 1′, 1″ and the gas-tight casing 2′, 2″ outside of the active zone. These fission gas spaces are formed by expanding the gas-tight casing or can 2′, 2″ at certain locations of the surface of the fuel element 1′, 1″ so that the gas-tight casing or can 2′, 2″ exhibits radially outwardly-directed projections. In FIG. 3, these projections are smaller than the indentations in the perforated enclosure 3′ which are radially inwardly directed and which are in contact with the gas-tight can or casing 2′, 2″ so that, in the embodiment of FIG. 2, only four contact points between the gas-tight casing 2′ and the perforated enclosure or container 3′ are sufficient, regardless of the number and size of the radially outwardly directed projections in the gas-tight casing 2′ which are provided to form the fission gas spaces or plena between the fuel element 1 and the gas-tight casing or can 2′.

A further advantageous construction of the entire fuel element assembly is produced if the length of the radially outwardly directed projections of the gas-tight casing or can 2″ are made so great that they engage the inner peripheral surface of the perforated enclosure or container 3, as in the embodiment of FIG. 4 and, in this manner, provides at the same time, fission gas spaces, as well as the means for centering the fuel element 1″ and mechanically supporting the perforated enclosure or container 3. In the embodiment of FIG. 4, the radially inwardly directed indentations in the perforated enclosure or container 3 may be omitted, and lower demands are made on the flexural stiffness of the material.

I claim:
1. A nuclear reactor fuel element comprising a spherical first container in which a sphere of nuclear fuel is received, said first container being of a gas-tight construction so as to separate the interior thereof from the outer surroundings, said first container being formed with outwardly directed projections, each of said projections being hollow and communicating with the interior of said first container, each of said projections having an inner surface speced from the surface of said sphere of nuclear fuel in said first continer to thereby provide a hollow space adapted to receive therein generated fission gases, said first container being received in a second container having at least an outer spherical shape and having an inner volume greater than the volume of said first container, said second container being formed with perforations adapted to admit a fluid to the interior of said second container to be received therein in addition to said first container, said perforated second container being formed with inwardly directed projections, said outwardly directed projections of said gas-tight first container engaging the inner surface of said perforated second container to thereby fix said fuel element in said second container.

References Cited
UNITED STATES PATENTS

| | | | |
|---|---|---|---|
| 3,249,509 | 5/1966 | Blocher, Jr. | 176—91 SP |
| 3,398,052 | 8/1968 | Jeitner et al. | 176—67 |
| 3,228,848 | 1/1966 | Fellows | 176—67 |
| 3,098,809 | 7/1963 | Huet | 176—91 SP |
| 3,649,452 | 3/1972 | Chin et al. | 176—91 SP |
| 3,350,274 | 10/1967 | Higatsberger | 176—91 SP |
| 3,325,373 | 6/1967 | Schlicht et al. | 176—91 R |
| 3,262,860 | 7/1966 | Zebroski | 176—91 R |
| 2,906,683 | 9/1959 | Quackenbush | 176—81 |

FOREIGN PATENTS

| | | | |
|---|---|---|---|
| 1,056,246 | 1/1967 | Great Britain | 176—45 |
| 1,084,999 | 9/1967 | Great Britain | 176—31 |

HARVEY E. BEHREND, Primary Examiner

U.S. Cl. X.R.

176—61, 91 SP

UNITED STATES PATENT OFFICE
CERTIFICATE OF CORRECTION

F-5501

Patent No. 3,794,560   Dated February 26, 1974

Inventor(s) FRANZ ROHR

It is certified that error appears in the above-identified patent and that said Letters Patent are hereby corrected as shown below:

In the heading to the printed specification, after line 3 insert --Assignee: Siemens Aktiengesellschaft, Berlin and Munc Germany--

Signed and sealed this 24th day of September 1974.

(SEAL)
Attest:

McCOY M. GIBSON JR.
Attesting Officer

C. MARSHALL DANN
Commissioner of Patents